Sept. 19, 1967  B. W. BRUNSON  3,342,145
FILLING DEPOSITOR

Filed Aug. 13, 1964  3 Sheets-Sheet 1

INVENTOR.
BRUCE W. BRUNSON
BY
ATTORNEYS

Sept. 19, 1967 B. W. BRUNSON 3,342,145
FILLING DEPOSITOR

Filed Aug. 13, 1964 3 Sheets-Sheet 2

INVENTOR.
BRUCE W. BRUNSON
BY
ATTORNEYS

INVENTOR.
BRUCE W. BRUNSON
BY
ATTORNEYS

United States Patent Office 3,342,145
Patented Sept. 19, 1967

3,342,145
FILLING DEPOSITOR
Bruce W. Brunson, Grand Rapids, Mich., assignor to Werner Machinery Company, Grand Rapids, Mich., a corporation of Michigan
Filed Aug. 13, 1964, Ser. No. 389,271
3 Claims. (Cl. 107—28)

This invention relates to a depositor of spaced, measured amounts of a viscous substance on a moving conveyor surface, and more particularly relates to a filling depositor capable of forming uniformly spaced deposits of filling, such as jam, of exactly controlled length, width and thickness on a strip of dough moving continuously on a conveyor belt.

Bake goods such as "turnovers," which the housewife prepares by heating, often contain a filling such as jam. Normally, attempts are made to keep the weight of jam relatively constant, but this is not critical as long as a specified minimum is met.

It is being contemplated now by food products producers to form generally square, filling-containing dough "slices" composed of two sheets of dough crimped together around their peripheries and containing a filling such as jam in the center therebetween. These slices are formed by cutting two enveloping upper and lower continuous strips of dough containing spaced jam deposits at intervals between the deposits. These slices, which are preferably frozen, are prepared by the housewife by placing them in a conventional toaster. Since the toaster slots are of a specific limited width, and since the dough and filling cannot be allowed to expand wider than the slots to contact the resistant heater elements or prevent removal of the slices, the amount of filling deposited, and particularly the thickness thereof, is very critical. The deposit must be of exactly controlled width, length and thickness to enable the product to be practical. Yet, it must be deposited intermittently in very rapid succession to enable the product to be commercially feasible.

It is therefore an object of this invention to provide a filling depositor capable of rapidly depositing exact volumes of viscous filling such as jam on a moving dough strip in deposits of exactly controlled and uniform thickness, width and length, and to do so at exact distance intervals on the dough strip to allow the dough to be cut therebetween.

Another object of this invention is to provide a jam depositor capable of forming deposits of exactly controlled amounts on a dough strip from a stationary depositing head above the moving strip, without dripping the jam in front of or behind the deposits, but rather with neat deposit edges.

These and several other objects of this invention will become apparent upon studying the following specification in conjunction with the drawings in which.

Figure 1:
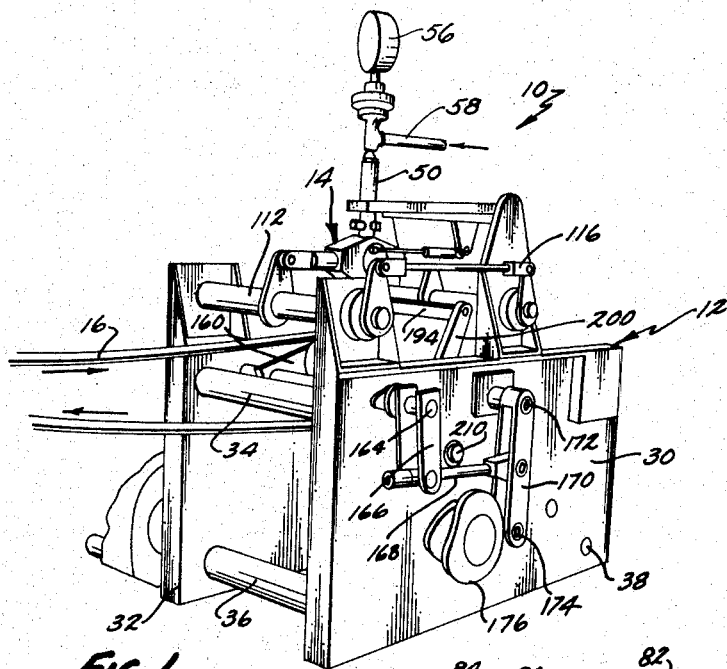
FIG. 1 is a perspective view of the front and one end of the novel apparatus.

Referring now specifically to the drawings, the complete depositor assembly 10 includes a framework subassembly 12, a reciprocating volume control dispenser subassembly 14, a conveyor belt subassembly 16, a belt dropper subassembly 18, a shiftable jam cutoff subassembly 20, and a drive motor subassembly 22.

The framework may actually assume various forms. It is specifically shown to include a pair of spaced, upright, rectangular, parallel plate supports 30 and 32 interconnected by rigid horizontal tie bars 34, 36, 38 (FIG. 1) and 40 (FIG. 4) adjacent the four corners.

Figure 6:
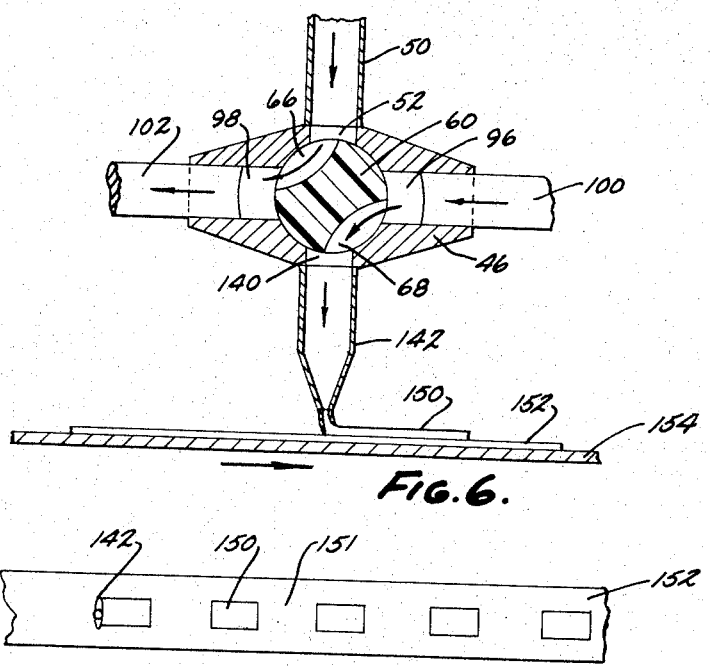
FIG. 6 is a sectional side elevational view showing the operation of the deposit control valve in the apparatus.
Figure 8:
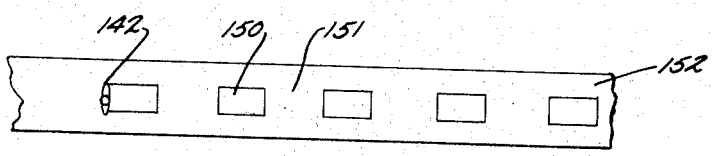
FIG. 8 is a diagrammatic plan view of the jam deposits formed by the novel apparatus.

The dispenser subassembly 14 includes a fixed, stationary, housing 46 forming a cylindrical valving chamber 48 (FIG. 3) having a horizontal axis transverse to the direction of conveyor movement for the apparatus. Connected to the top of this housing is a jam inlet pipe 50 communicating with a housing inlet port 52 (FIG. 6). Mounted on the top of inlet pipe 50 is a pressure gauge 56. A transverse jam inlet pipe 58 from a constant pressure jam supply (not shown) is connected to pipe 50, to allow pressurized jam to be forced through the pipes and through inlet orifice 52 into the valving chamber.

Figure 7:
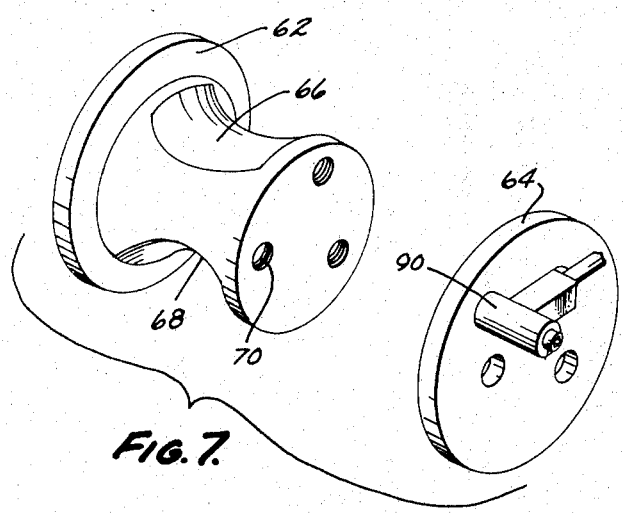
FIG. 7 is a perspective exploded view of the valving element in the deposit control valve in FIG. 6.

The valving chamber contains an elongated, generally cylindrical element 60 formed of a suitable plastic and having a pair of enlarged end caps 62 and 64 securing it in the housing and forming bearings. It has a pair of oppositely positioned concavities 66 and 68 (FIG. 7) on its periphery. Each concavity in effect has inlet and outlet ends circumferentially spaced substantially 90° from each other on the cylindrical valve. At least one end cap 64 of this valving element is removable using threaded connectors fitting in sockets 70. This enables the valving member to be removed for cleaning. This valving member is rotatable on its horizontal axis in the horizontal valve chamber. Its rotation is achieved by fluid cylinder 76.

This fluid cylinder is mounted at its rear end to a rigid support 78 (FIG. 2) attached to cross element 80 between upward extensions 82 and 84 of the frame. The forward end of the cylinder piston rod 88 is secured to end cap 64 through a rotatable coupling 90 off center of the cylindrical valve axis. Reciprocation of the cylinder causes rotation of the valve 90° from one extremity to the other. This rotation causes alternate alignment of the jam inlet with the displacement cylinders (to be described).

Referring to FIG. 6, housing 46 includes a pair of horizontally extending co-axial, cylindrical, displacement or measuring chambers 96 and 98 extending from opposite ends of the housing to the valving chamber. Slidably mounted within these chambers is a pair of reciprocable displacement pistons 100 and 102, respectively. These are operably connected through links 104 and 106 (FIG. 2) to a pair of cranks 108 and 110, respectively. These cranks are mounted on one end of a pair of transverse parallel shafts 112 and 114, to be oscillated back and forth and thereby reciprocate the pistons simultaneously in like directions in the stationary housing 46. The two shafts 112 and 114 are operably interconnected by coordinating linkage means 116 comprising a pair of separate cranks and a connecting rod to assure this simultaneous reciprocation.

On the other end of shaft 112 is mounted an adjustable oscillatory crank 120 (FIG. 3), in turn secured to a reciprocable shaft 122. The opposite end of shaft 122 is pivotally mounted to the middle of an oscillatory arm 124. Arm 124 is pivotally mounted at one end 126, and has a cam follower 128 on the opposite end. This cam follower operably engages a special rotatable cam 130 due to the bias of tension spring 132 pulling the follower into constant engagement with the cam. The cam makes one revolution for each two deposits. It has two constant motion segments with constantly changing radii, to oscillate pistons 100 and 102 with a constant velocity. Two short dwell portions 131 and 133 (FIG. 5) at the small radius and large radius areas of the cam cause the uniform spaces 151 between the filling deposits, which are also uniform.

Depositor housing 46 also has an outlet passage 140 in its bottom, opposite the inlet passage and 90° removed from each of the displacement cylinders. An elongated outlet nozzle 142 is connected to the housing in communication with this passage. It includes a flared, laterally elongated, mouth on its lower end having a substantial width laterally of the conveyor belt, and a relatively narrow dimension in the direction of the belt travel, to lay down relatively wide and controlled thickness deposits of jam 150.

Figure 3:
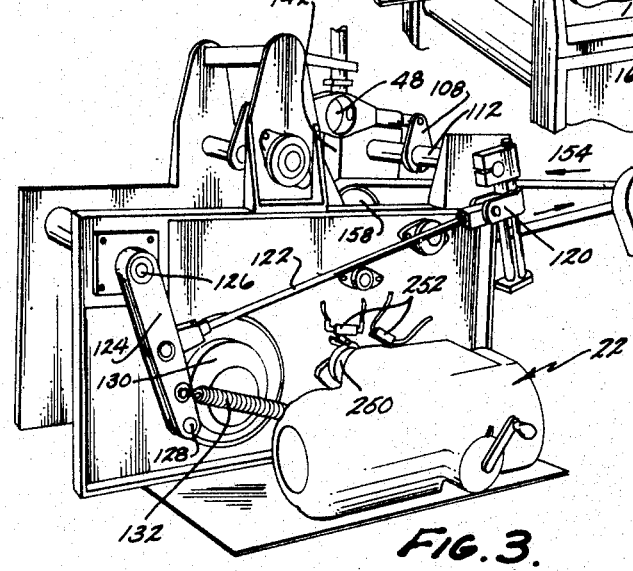
FIG. 3 is a perspective view of the back and opposite end of the apparatus.

The jam is sufficiently viscous to hold its shape when not under positive pressure. It will flow under pressure and is deposited on a continuous strip of dough 152 supported on a continuous conveyor belt 154 passing through the machine. This conveyor belt is driven by any suitable drive mechanism 156 (FIG. 3). It passes over idler roller 158 in the machine beneath the jam depositor, around a suitable return pulley 160 (FIG. 4) and returns. The length of the belt and the ultimate destination thereof can, of course, be variably controlled.

Figure 2:
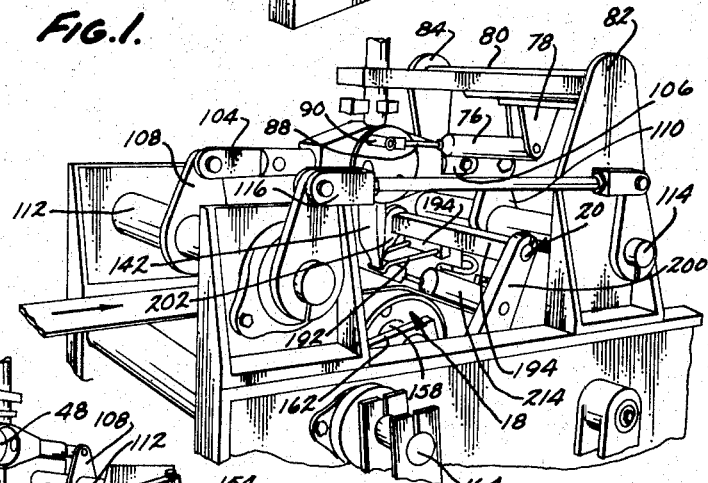
FIG. 2 is an enlarged fragmentary perspective view of the apparatus as shown in FIG. 1.
Figure 5:
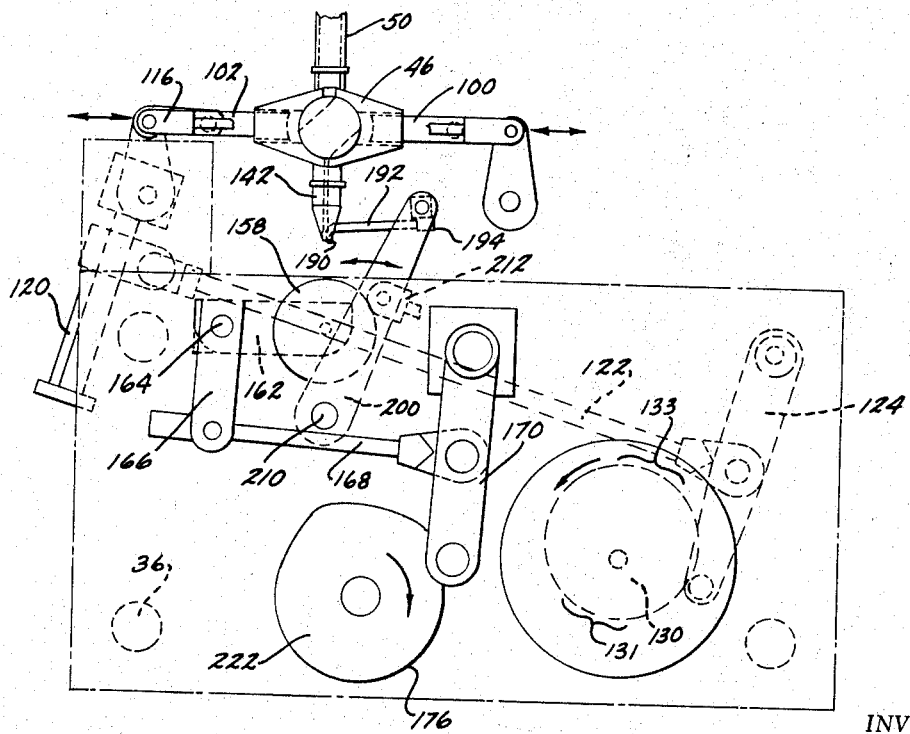
FIG. 5 is an elevational view of the apparatus showing the interrelationship of the operative moving components thereof.

The idler roller 158 actually forms part of the roller drop mechanism 18 (FIG. 2). This guide roller 158 is rotatably supported on a pair of straddling arms 160 (FIG. 1) and 162 (FIGS. 2 and 5). The opposite ends of these arms are pivotally mounted to a shaft 164 extending through supports 30 and 32. Keyed to this shaft, externally of support 30, is a crank 166 pivotally connected on its lower end to shaft 168, which in turn is connected to the midpoint of arm 170. Arm 170 is pivotally mounted at its upper end 172 to frame element 30. On the lower end of arm 170 is a cam follower 174 which rides rotational cam 176. Rotation of this cam, therefore, causes oscillation of arm 170 and shaft 164 to raise and lower guide roller 158 in a controlled fashion. This drops the belt and dough strip at intervals to create a momentary tension in the viscous jam being deposited, causing the jam to "break off" neatly and terminate the flow momentarily.

Figure 4:
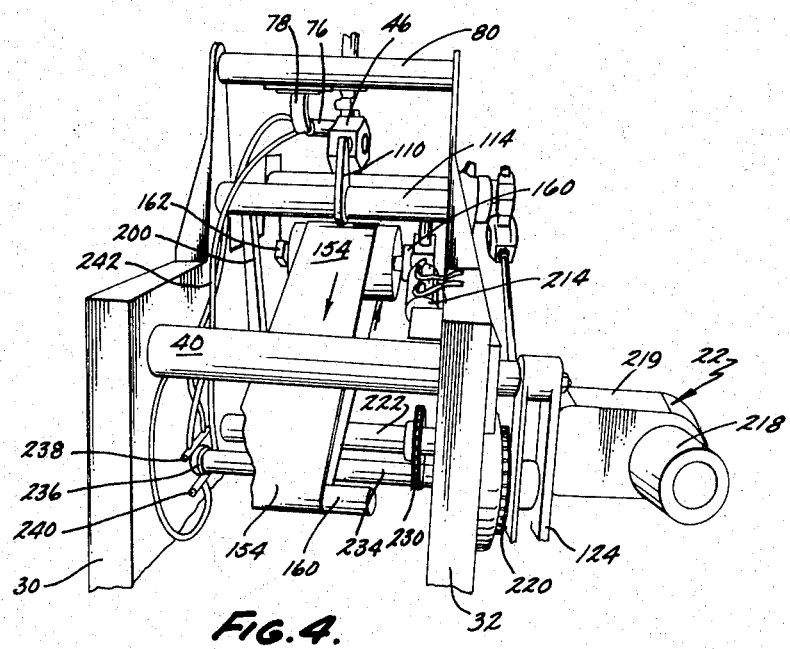
FIG. 4 is a perspective end view of the apparatus taken from the opposite end as that shown in FIG. 1.

Another mechanism may also be employed for assuring complete and neat separation of the jam after each individual deposit. This is the jam cut-off subassembly 20. It includes a cut-off wire 190 mounted between a pair of fingers 192 attached to cross piece 194 at their opposite ends (FIG. 5). The wire is normally positioned adjacent the output mouth of nozzle 142 (FIG. 5). The cross piece 194 is attached between a pair of upright pivotal arms 200 and 202 (FIGS. 1 and 2). The lower ends of these arms are both pivotally mounted on a transverse shaft 210 (FIG. 1 and FIG. 5). Attached intermediate the ends of arm 202 is a clevis 212 (FIG. 5) connected to the extended rod of fluid cylinder 214 (FIG. 4 and FIG. 2). The cylinder itself is mounted on its opposite end to the frame. Extension and retraction of the cylinder causes the cut-off wire to pass across the nozzle mouth and sever the jam.

In use, these two deposit severance devices may be used alternatively, or simultaneously to terminate the deposits with neat, non-dripping trailing edges.

Mounted adjacent the back frame support 32 is a motor 218 and gear box 219 of the drive assembly 22. The gear box output shaft drives chain 220, which in turn drives a sprocket mounted on shaft 222. Shaft 222 extends between the supports, and through the support 30, to mount cam 176 on the front of the assembly (FIG. 5 and FIG. 1). Also, a second drive chain 230 extends around a sprocket on shaft 222 and around a sprocket on shaft 234 (FIG. 4). Shaft 234 mounts cam 130 (FIG. 3) on the back side of the frame. It also carries a smaller valve operating cam 236 (FIG. 4) which operates a set of valves 238 and 240 that controls air through hoses 242 to cylinder 76 that rotates distributing valve 60 for the jam. Another valve operating cam 260 (FIG. 3), mounted on the drive output of the motor assembly, actuates valves 252 which control the air supply to cylinder 214 to operate the jam cut-off wire.

OPERATION

In operation, filling is supplied to pipe 58 and thus to pipe 50 under a positive pressure from a constant pressure filling supply (not shown). The pressure is indicated on gauge 56. The jam filling enters housing 46 through passage 52 (FIG. 6) and into valve chamber 48 (FIG. 3). Cylindrical valve member 60 is in one position, or another position 90° removed. Assuming that it is first in the position illustrated in FIG. 6, the jam is forced through passage 66 which transverses the 90° between inlet passage 62 and displacement chamber 98. The output shaft of drive assembly 22 operates chain 220 (FIG. 4) to rotate shaft 222, which in turn drives chain 230 and shaft 234 to rotate cam 130. This causes oscillation of arms 124, 122, and crank 120 to reciprocate cranks 108 and 110, simultaneously inserting piston 100 into displacement cylinder 96 and withdrawing piston 102 from displacement cylinder 98 (FIG. 6). As piston 102 withdraws, it allows jam to be forced into displacement cylinder 98 to fill it. As this piston reaches the end of its stroke, and the crank mechanism begins to move in reverse, cam 236 (FIG. 4) and shaft 234 oscillates air valves 238 and 240 to retract cylinder 76 and rotate valve member 60 a shift of 90°. At this position, passage 66 communicates between jam inlet 52 and the second displacement cylinder 96, and passage 68 communicates the full displacement cylinder with the outlet nozzle. Thus, reciprocation of the pistons in the opposite direction will force the jam from displacement cylinder 98 out the nozzle and onto moving dough strip 152 in an exactly controlled thickness, width and length jam deposit 150. At the end of this deposit, the pistons reciprocate in the opposite direction to fill the other cylinder and empty the opposite one. Also, at the end of the jam deposit, control valves 252 (FIG. 3) actuate cylinder 214 to shift arms 200 and 202 and thereby shift the cut-off wire across the mouth of nozzle 142. This neatly separates the jam at the end of the deposit to prevent the jam from trailing off gradually. Also, alternatively or simultaneously, belt drop mechanism 18 is actuated by rotational cam 176 to cause oscillation of arms 170, 168, 166, 162, to thus momentarily drop guide roller 158 away from the nozzle and put a sudden tension on the jam at the nozzle mouth. This helps sever the jam also. The deposit thickness equals the narrow dimension of said mouth in the direction of belt movement. The front edge of each viscous deposit it substantially normal to the strip due to its neat cut surface and its viscosity to retain it. This is true for the severed rear edge also.

The dough strip 152 moves continuously along at a constant speed, and even though the deposit head and valve housing assembly are fixed and stationary, the jam deposits 150 are of uniform and exact thickness, width, length and spacings 151 in exactly controlled fashion. Yet, in production, the mechanism can operate rapidly to make the product feasible.

After depositing, a second dough strip is placed over the top of the dough deposits, the dough is crimped around each of the jam deposit peripheries, and is sliced at intervals 151 to form separate jam containing "slices" capable of being placed in a conventional toaster.

It is conceivable that those having ordinary skill in this art will discover other advantages not specifically recited above. Also, it is conceivable that variations in the details of the structure from the preferred components illustrated in their particular preferred relationship can be achieved without departing from the inventive concept set forth herein. Therefore, this invention is to be limited only by the scope of the appended claims and the reasonable equivalents thereto.

I claim:

1. A filling depositor comprising: a framework; a deposit valve housing fixedly mounted in a stationary position on said framework; conveyor belt guide and support means through said framework and a driven conveyor belt thereon; a cylindrical valve chamber in said housing on a horizontal axis transverse to the direction of movement of said belt; a filling inlet port in the top of said chamber and a filling outlet port in the bottom of said chamber; a pair of oppositely positioned measuring chambers on opposite peripheral sides of said valve chamber, displaced 90° from said inlet and outlet; a rotatable cylindrical valve in said valve chamber having a pair of peripheral concavities forming passages circumferentially spaced 90° at their inlets and outlets; a pressurized filling inlet conduit to said inlet port; a deposit nozzle on said outlet port, having a laterally elongated downwardly directed mouth with a narrow dimension in the direction of movement of said belt; a pair of reciprocable pistons in said measuring chambers shiftable toward and away from said valve chamber; reciprocable drive means connected to said pistons and including operably associated cranks and camming means; coordinating linkage means associated with said pistons causing simultaneous movement of said pistons in like directions; valve rotating means operably connected to said valve including extensible means connected to said framework and to said valve eccentric to its axis, to rotate it back and forth in 90° intervals, causing alternate communication between said inlet and one measuring chamber and said outlet and the other measuring chamber, and vice versa; shiftable filling severance means to separate the deposited filling from filling still in said nozzle; and time coordinated control means including said cranks and camming means operably associated with said reciprocal drive means, said valve rotating means, and said severance means to cause repeated simultaneous filling of one measuring chamber and deposit emptying of the other, and formation of uniform spaced deposits of filling on a dough strip traveling on said belt, said camming means being a cam having two constant motion drive segments of equal lengths and changing radii to oscillate said pistons and obtain uniform length deposits, spaced by two equal length, non-drive, dwell segments to cause uniform spaces between the deposits.

2. The apparatus in claim 1 wherein said severance means comprises a wire mounted to shift across said nozzle mouth.

3. The apparatus in claim 1 wherein said severance means comprises a shiftable belt dropping support to create sudden tension on the filling at said nozzle mouth.

References Cited

UNITED STATES PATENTS

| | | | |
|---|---|---|---|
| 1,156,407 | 10/1915 | Kettner | 107—28 |
| 1,260,558 | 3/1918 | Legler | 107—27 X |
| 3,132,608 | 5/1964 | Leuze | 107—29 |

WALTER A. SCHEEL, *Primary Examiner.*

J. SHEA, *Assistant Examiner.*